United States Patent
Hansen (10) Patent No.: US 10,454,293 B2
(45) Date of Patent: Oct. 22, 2019

(54) SYSTEM AND METHOD FOR CHARGING A CAPACITOR

(71) Applicant: AVX Corporation, Fountain Inn, SC (US)

(72) Inventor: Shawn Hansen, Simponsville, SC (US)

(73) Assignee: AVX Corporation, Fountain Inn, SC (US)

(*) Notice: Subject to any disclaimer, the term of this patent is extended or adjusted under 35 U.S.C. 154(b) by 145 days.

(21) Appl. No.: 15/598,851

(22) Filed: May 18, 2017

(65) Prior Publication Data

US 2017/0338669 A1 Nov. 23, 2017

Related U.S. Application Data

(60) Provisional application No. 62/339,167, filed on May 20, 2016.

(51) Int. Cl.
| | | |
|---|---|---|
| H02J 7/00 | (2006.01) |
| H01G 11/60 | (2013.01) |
| H01G 11/62 | (2013.01) |
| H01G 11/18 | (2013.01) |
| H01G 11/32 | (2013.01) |
| H02J 7/34 | (2006.01) |

(52) U.S. Cl.
CPC ............ *H02J 7/007* (2013.01); *H01G 11/18* (2013.01); *H01G 11/60* (2013.01); *H01G 11/62* (2013.01); *H02J 7/0091* (2013.01); *H01G 11/32* (2013.01); *H02J 7/345* (2013.01)

(58) Field of Classification Search
CPC ............... H02J 7/007; H02J 7/0091

USPC ......................................................... 320/150
See application file for complete search history.

(56) References Cited

U.S. PATENT DOCUMENTS

| | | |
|---|---|---|
| 6,480,368 B1 | 11/2002 | Lammers et al. |
| 6,738,242 B1 | 5/2004 | Okamura et al. |
| 6,806,686 B1 | 10/2004 | Thrap |
| 6,952,338 B1 | 10/2005 | Gallay et al. |
| 7,016,177 B1 | 3/2006 | Thrap |
| 7,027,290 B1 | 4/2006 | Thrap |
| 7,042,197 B2 | 5/2006 | Turner et al. |

(Continued)

FOREIGN PATENT DOCUMENTS

| | | |
|---|---|---|
| EP | 1 255 261 A1 | 11/2002 |
| JP | 5304654 | 10/2013 |

(Continued)

OTHER PUBLICATIONS

International Report on Patentability for PCT/US2017/033129 dated Nov. 20, 2018, 10 pages.

(Continued)

*Primary Examiner* — Suchin Parihar
(74) *Attorney, Agent, or Firm* — Dority & Manning, P.A.

(57) ABSTRACT

Systems and methods of charging and discharging an ultracapacitor are disclosed. In one embodiment, a circuit for charging a capacitor can include a power source configured to provide a source voltage. The circuit can further include an ultracapacitor, a temperature sensing device, a power converter, and one or more control devices configured to receive signals indicative of a temperature from the temperature sensing device, and to control operation of the power converter based at least in part on the one or more signals indicative of the temperature.

28 Claims, 2 Drawing Sheets

(56) References Cited

U.S. PATENT DOCUMENTS

| | | |
|---|---|---|
| 7,167,353 B2 | 1/2007 | Yuyama et al. |
| 7,170,738 B2 | 1/2007 | Scheidegger et al. |
| 7,180,726 B2 | 2/2007 | Thrap |
| 7,342,768 B2 | 3/2008 | Doljack et al. |
| 7,345,454 B2 | 3/2008 | Thrap |
| 7,427,851 B2 | 9/2008 | Takemoto et al. |
| 7,440,258 B2 | 10/2008 | Thrap et al. |
| 7,457,100 B2 | 11/2008 | Nakajima et al. |
| 7,474,879 B2 | 1/2009 | Turner et al. |
| 7,482,816 B2 | 1/2009 | Odajima et al. |
| 7,483,257 B2 | 1/2009 | Scheidegger et al. |
| 7,489,496 B2 | 2/2009 | Scheidegger et al. |
| 7,511,942 B2 | 3/2009 | Thrap |
| 7,531,987 B2 | 5/2009 | Ohasi et al. |
| 7,599,167 B2 | 10/2009 | Doljack |
| 7,599,168 B2 | 10/2009 | Doljack et al. |
| 7,647,191 B2 | 1/2010 | Kakiuchi et al. |
| 7,660,084 B2 | 2/2010 | Kim et al. |
| 7,859,826 B2 | 12/2010 | Thrap et al. |
| 7,880,449 B2 | 2/2011 | Thrap |
| 7,969,121 B2 | 6/2011 | Smith et al. |
| 8,134,337 B2 | 3/2012 | Morita |
| 8,198,870 B2 | 6/2012 | Zuercher |
| 8,305,035 B2 | 11/2012 | Morita et al. |
| 8,411,413 B2 | 4/2013 | Eilertsen |
| 8,463,562 B2 | 6/2013 | Nakanishi |
| 8,686,662 B1 | 4/2014 | Bragg et al. |
| 9,013,144 B2 | 4/2015 | Cooley et al. |
| 9,018,922 B2 | 4/2015 | Morita et al. |
| 9,190,860 B2 | 11/2015 | Wright et al. |
| 9,209,653 B2 | 12/2015 | Maynard et al. |
| 9,272,627 B2 | 3/2016 | Miller |
| 9,515,510 B2 | 12/2016 | Newlin |
| 9,627,908 B2 | 4/2017 | Kaminsky et al. |
| 9,653,824 B2 | 5/2017 | Stone et al. |
| 9,728,339 B2 | 8/2017 | Guillet et al. |
| 9,892,868 B2 | 2/2018 | Pyzza et al. |
| 9,899,643 B2 | 2/2018 | Pyzza et al. |
| 9,954,382 B2 | 4/2018 | Cooley et al. |
| 2007/0216425 A1 | 9/2007 | Okamura et al. |
| 2009/0009177 A1 | 1/2009 | Kim et al. |
| 2009/0231764 A1 | 9/2009 | Banting et al. |
| 2010/0079109 A1 | 4/2010 | Eilertsen et al. |
| 2012/0200308 A1 | 8/2012 | Donne |
| 2012/0235473 A1* | 9/2012 | Jiang .......... H01M 2/1072 307/9.1 |
| 2012/0319471 A1* | 12/2012 | Miller .......... B60L 3/0046 307/9.1 |
| 2014/0114592 A1 | 4/2014 | Eilertsen |
| 2016/0146173 A1 | 5/2016 | Mars et al. |
| 2016/0243960 A1 | 8/2016 | Wood et al. |
| 2016/0301221 A1 | 10/2016 | Kaminsky |
| 2018/0030945 A1* | 2/2018 | Caballero Atienzar ............. F02N 11/08 |
| 2018/0175633 A1 | 6/2018 | Kaminsky |
| 2018/0212442 A1 | 7/2018 | Yan et al. |

FOREIGN PATENT DOCUMENTS

| | | |
|---|---|---|
| KR | 100733394 | 6/2007 |
| KR | 100998661 | 12/2010 |
| WO | WO2009118119 | 10/2009 |
| WO | WO2009118120 | 10/2009 |
| WO | WO 2015000017 | 1/2015 |

OTHER PUBLICATIONS

International Search Report and Written Opinion for PCT/US2017/033129 dated Aug. 30, 2017, 13 pages.

* cited by examiner

SYSTEM AND METHOD FOR CHARGING A CAPACITOR

RELATED APPLICATIONS

The present application claims priority to U.S. Provisional Application Ser. No. 62/339,167, filed on May 20, 2016, which is incorporated herein in its entirety by reference thereto.

BACKGROUND OF THE INVENTION

Electrical energy storage cells are widely used to provide power to electronic, electromechanical, electrochemical, and other useful devices. An electric double layer ultracapacitor, for instance, generally employs a pair of polarizable electrodes that contain carbon particles (e.g., activated carbon) impregnated with a liquid electrolyte. One problem associated with many conventional ultracapacitors, however, is that they are relatively sensitive to high temperatures. As such, a need currently exists for a technique that allows such ultracapacitors to operate at high temperatures.

SUMMARY OF THE INVENTION

In accordance with one embodiment of the present invention, a circuit is disclosed for providing a drive voltage to an ultracapacitor. The circuit includes a power source configured to provide a source voltage. The circuit further includes an ultracapacitor, which comprises a first electrode, a second electrode, a separator positioned between the first electrode and the second electrode, a nonaqueous electrolyte that is in ionic contact with the first electrode and the second electrode, and a housing within which the first electrode, the second electrode, the separator, and the electrolyte are retained. The circuit also includes a temperature sensing device and a power converter configured to receive the source voltage and to supply a drive voltage to the ultracapacitor. The circuit further includes one or more control circuits configured to receive one or more signals indicative of a temperature from the temperature sensing device and to control operation of the power converter based at least in part on the one or more signals indicative of the temperature.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Repeat use of references characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a power management circuit that can operate an ultracapacitor based at least in part on a temperature associated with the ultracapacitor. According to example aspects of the present invention, the power management circuit can include a power converter configured to receive a direct current (DC) input and to convert the DC input to a suitable drive voltage suitable for operating the ultracapacitor (e.g., either during charging or discharging conditions). In some embodiments, the drive voltage can be determined based at least in part on a temperature associated with the ultracapacitor, such as the temperature of the ambient in which the ultracapacitor operates. More particularly, a temperature sensing device, such as a thermistor device, can be used to determine the temperature associated with the ultracapacitor. A drive voltage for charging/discharging the ultracapacitor can be determined based at least in part on the determined temperature. In this way, the systems and methods according to example embodiments of the present invention can provide for derating the drive voltage of the ultracapacitor as temperature increases, providing for increased ability to operate the ultracapacitor at higher temperatures.

More particularly, the power management circuit can include a power converter that can be configured to convert a DC input into a suitable drive voltage for operating the ultracapacitor. In some embodiments, the power converter can be an integrated circuit that includes one or more switching elements, such as one or more metal-oxide semiconductor field-effect transistors (MOSFETs) or other suitable switching elements. The power converter can include or can be coupled to one or more control devices (e.g., one or more processors, microcontrollers, etc.). Operation of the power converter can be controlled by one or more control devices in accordance with a switching control scheme, such as a pulse width modulation control scheme. In this manner, the power converter can be controlled to convert the DC input into a suitable drive voltage for the ultracapacitor.

According to example embodiments of the present invention, the one or more control devices can control operation of the power converter based on one or more signals indicative of temperature associated with the ultracapacitor. The one or more signals can be received from a temperature sensing device. In some embodiments, the temperature sensing device can be thermistor, such as a negative temperature coefficient thermistor device or a positive coefficient thermistor device. Other suitable temperature sensing devices can be used without deviating from the scope of the present invention.

The one or more control devices can determine a drive voltage for operating the ultracapacitor based at least in part on the one or more signals indicative of temperature associated with the ultracapacitor. In some implementations, the drive voltage can be determined based at least in part on a derating curve. The derating curve can correlate or otherwise map drive voltage to temperature. As an example, the derating curve can specify an inverse correlation between operating voltage and capacitor temperature. In this manner, the drive voltage supplied to the capacitor can be decreased to compensate for increased temperatures. Such decreased drive voltages can allow the capacitor to more efficiently operate at the increased temperatures.

Figure 1:
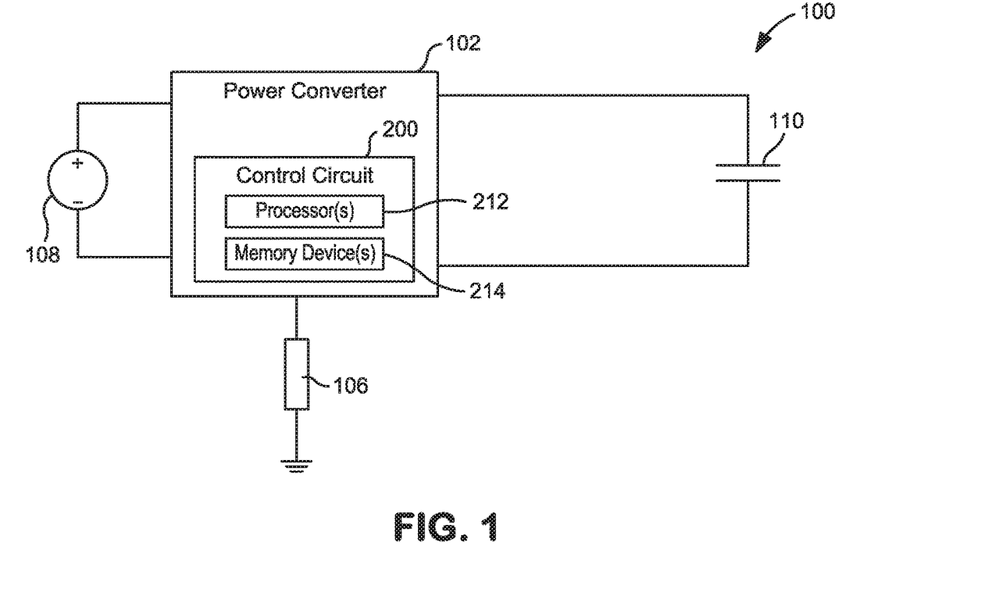
FIG. 1 depicts an example circuit for charging and/or discharging a capacitor according to example embodiments of the present invention.

With reference now to the figures, example aspects of the present invention will be discussed in greater detail. For instance, FIG. 1 depicts an overview of an example power management circuit 100 according to example embodiments of the present invention. The circuit 100 includes a power converter 102, a control circuit 200, and a temperature sensing device 106. The power converter 102 can be configured to receive a DC source voltage from a DC power source 108, and to convert the source voltage into a drive voltage suitable for operating the capacitor 110. The power converter 102 can be, for instance, an integrated circuit that includes one or more switching elements, such as one or more transistors (e.g. MOSFETs or other switching elements). The power converter 102 can further include one or more additional components, such as one or more diodes, capacitors, inductors, etc. In some implementations, the power converter 102 can be a buck-boost converter configured to operate as a buck converter during one or more charging periods when ultracapacitor 110 is being charged and as a boost converter during one or more discharging periods when ultracapacitor 110 is being discharged.

The temperature sensing device 106 can be any suitable temperature sensing device, such as for instance, a thermistor device. The temperature sensing device 106 can be configured to provide one or more signals indicative of an ambient or temperature associated with the ultracapacitor 110 to the control circuit 200. In some implementations, the control circuit 200 can be configured to determine a temperature value based at least in part on the one or more signals received from the temperature sensing device. For instance, in implementations wherein temperature sensing device 106 is a thermistor device, the one or more signals indicative of the temperature can specify a resistance or a voltage across the thermistor device.

The control circuit 200 can be integrated with or can be separate from the power converter 102. As shown in FIG. 1, the control circuit 200 can include, for instance, one or more processor(s) 212 and one or more memory device(s) 214. The one or more memory devices can store computer-readable instructions implemented in hardware, firmware, software, etc. The instructions, when executed by the processor(s) 212, can cause the processor(s) 212 to perform operations according to example aspects of the present invention. For instance, the instructions when executed by the processor(s) 212 can cause the processor(s) 212 to control the power converter 102 based at least in part on one or more signals received from a temperature sensing device 106 according to example embodiments of the present invention.

In particular embodiments, the one or more processors 212 can include integrated circuits referred to in the art as being included in a computer. In addition and/or in the alternative the one or more processors 212 can include a controller, a microcontroller, a microcomputer, a programmable logic controller (PLC), an application specific integrated circuit, and other programmable circuits. The one or more memory devices 214 can generally include memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 214 can generally be configured to store suitable computer-readable instructions that, when implemented by the processor(s) 212, configure control circuit 200 to perform the various functions as described herein.

For instance, the control circuit 200 can be configured to determine a temperature associated with the ultracapacitor 110 based on signal(s) received from the temperature sensing device 106. The temperature can be determined based at least in part on the signals provided from temperature sensing device 106. For instance, in implementations wherein temperature sensing device 106 is a thermistor device, control circuit 200 can determine the temperature by accessing a lookup table correlating thermistor resistance to thermistor temperature. In some implementations, control circuit 200 can determine the temperature by solving a Steinhart-Hart equation associated with the thermistor device.

The control circuit 200 can be configured to determine a drive voltage level to be supplied to the ultracapacitor 110 based at least in part on the determined temperature. The drive voltage can be determined based at least in part on a derating curve or other correlation of capacitor temperature to capacitor voltage associated with the ultracapacitor 110. For instance, in some implementations, the drive voltage can be determined by accessing a lookup table. As indicated above, the drive voltage can be inversely correlated to the temperature, such that the drive voltage decreases with an increase in temperature. In some implementations, the derating of the drive voltage can be determined based at least in part on a rated working voltage associated with the ultracapacitor 110. For instance, the drive voltage derating can be specified as a percentage with respect to the working voltage.

In some implementations, the control circuit 200 can be configured to determine a drive voltage without determining a temperature associated with ultracapacitor 110. In such implementations, a drive voltage can be determined directly from the one or more signals received from temperature sensing device 106. For instance, the drive voltage can be determined based at least in part on a measured resistance of temperature sensing device 106. As another example, the resistance of temperature sensing device 106 can be determined based at least in part on a measured voltage across temperature sensing device 106. The resistance can be correlated to a drive voltage using a lookup table and/or a derating curve specifying capacitor voltage as a function of resistance of temperature sensing device 106.

The control circuit 200 can further be configured to control operation of converter 102 based at least in part on the determined drive voltage. In particular, the control circuit 200 can be configured to control a switching operation of the one or more switching element(s) of converter 102 to provide a desired drive voltage during the one or more charging periods associated with ultracapacitor 110. For instance, the control circuit 200 can control the switching operation of the one or more switching elements in accordance with a switching scheme, such as a pulse width modulation switching scheme. In this manner, the switching element(s) can be switched on an off such that the desired drive voltage is supplied to ultracapacitor 110.

As indicated, the control circuit 200 can be configured to adjust the drive voltage supplied to ultracapacitor 110 one or more times based at least in part on temperature deviations within circuit 100. In some implementations, the control circuit 200 can measure a temperature associated with circuit 100 on a periodic or other basis to determine whether drive voltage adjustments need to be made. For instance, the control circuit 200 can measure the temperature during or immediately prior to each charging period to determine respective drive voltages for each charging period. As another example, the control circuit 200 can measure the temperature on a temporal basis, such as once every predetermined time interval or period. In some implementations, the frequency of temperature measurements can be determined based at least in part on a frequency at which the temperature varies within the circuit 100.

Figure 2:
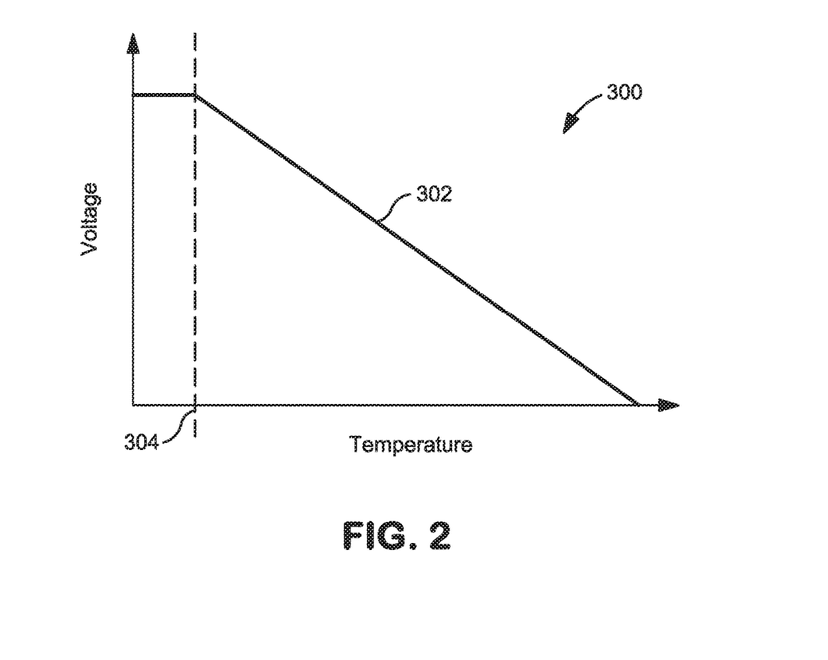
FIG. 2 depicts a plot of an example capacitor derating curve according to example embodiments of the present invention.

FIG. 2 depicts a plot 300 of an example capacitor derating curve 302 according to example embodiments of the present invention. The derating curve 302 plots voltage to be supplied to a capacitor (e.g. ultracapacitor 110) as a function of capacitor temperature. As shown, voltage is constant at temperatures below a derating point 304. At temperatures higher than the derating point 304, the voltage is decreased or derated as a function of temperature. As shown, at temperatures higher than the derating point 304, the derating curve 302 specifies a decreased voltage to be supplied to the capacitor as capacitor temperature increases. As indicated, voltages at temperatures higher than the derating point 304 can be expressed as a percentage of a working voltage associated with the capacitor.

The derating curve 302 specifies one example manner in which capacitor voltage can be derated. In particular, it will be appreciated by those skilled in the art that various other suitable derating curves can be used without deviating from the scope of the present invention. For instance, various other derating curves can be determined and used based at least in part on various properties and characteristics of the capacitor and/or the circuit in which the capacitor is implemented. In addition, although plot 300 depicts a linear derating curve 302, non-linear derating curves can be used, such as exponential derating curves, step-function derating curves, etc.

Figure 3:
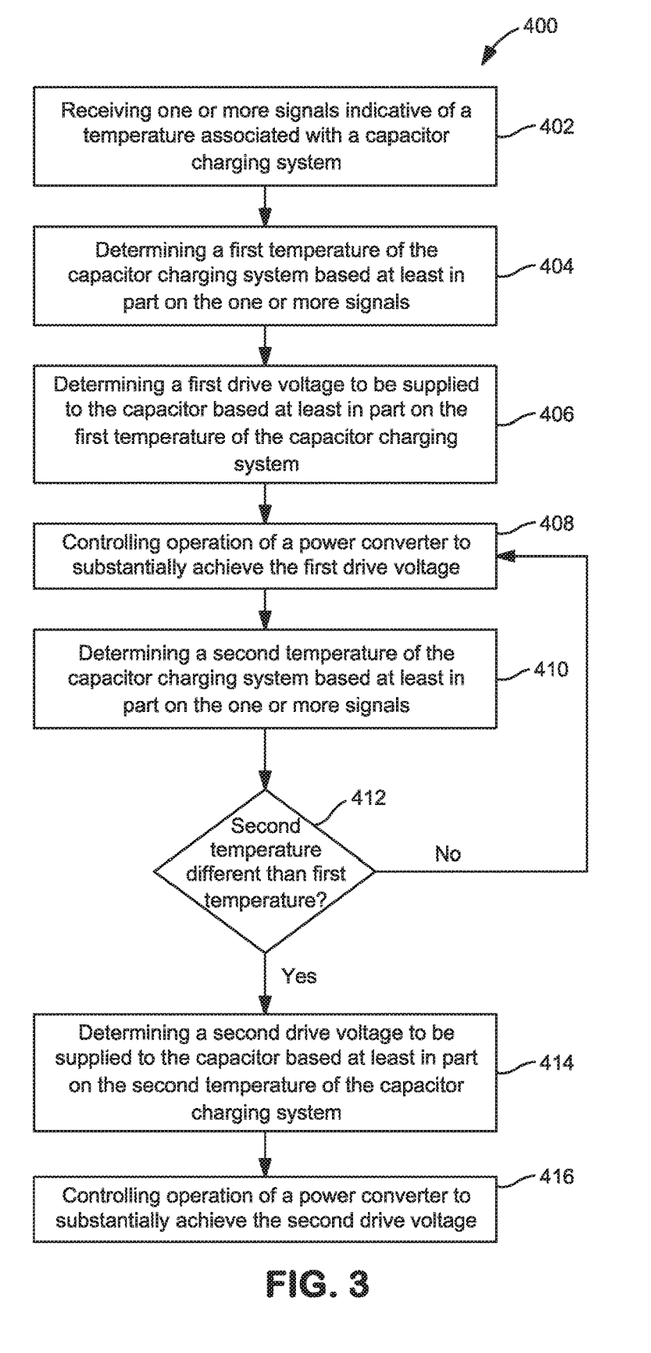
FIG. 3 depicts a flow diagram of an example method of charging a capacitor according to example embodiments of the present invention.

FIG. 3 depicts a flow diagram of an example method (400) of charging an ultracapacitor according to example embodiments of the present invention. The method (400) can be implemented by one or more computing devices, such as one or more of the computing devices depicted in FIG. 1. In addition, FIG. 3 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present invention.

At (402), the method (400) can include receiving one or more signals indicative of a temperature associated with a capacitor power management circuit. As indicated above, the one or more signals indicative of the temperature can be provided by a temperature sensing device (e.g. thermistor device) associated with the capacitor power management circuit. For instance, the one or more signals can include data indicative of a voltage across the temperature sensing device and/or a resistance of the temperature sensing device.

At (404), the method (400) can include determining a first temperature of the temperature sensing device and/or the capacitor power management circuit based at least in part on the one or more signals indicative of the temperature. As indicated, the determined temperature of the temperature sensing device can correspond to an ambient temperature associated with the capacitor power management circuit.

At (406), the method (400) can include determining a first drive voltage to be supplied to one or more ultracapacitors based at least in part on the first temperature of the capacitor power management circuit. The drive voltage can be a voltage used to charge the one or more ultracapacitors in the capacitor power management circuit. In some implementations, the drive voltage can be determined based at least in part on a rated working voltage or other suitable property of the ultracapacitor(s). In some implementations, the drive voltage can be determined based at least in part on a predetermined derating curve associated with the ultracapacitor(s). For instance, data indicative of the derating curve (e.g. lookup table) can be obtained or accessed, and the first drive voltage can be determined based at least in part on the data indicative of the derating curve. In particular, the first drive voltage can be the voltage along the derating curve corresponding to the first temperature.

At (408), the method (400) can include controlling operation of a power converter associated with the capacitor power management circuit to substantially achieve the first drive voltage. For instance, a switching operation associated with one or more switching elements of the converter can be determined such that, when the switching element(s) are switched on and off in accordance with the switching operation, the power converter substantially provides the first drive voltage as output. The switching operation can be a pulse width modulation switching scheme applied to a gate or base of the switching element(s), or other suitable switching scheme.

In some implementations, the converter can be controlled to output the drive voltage in accordance with a capacitor charging operation. For instance, the charging operation can include a plurality of charging periods during which voltage is supplied to the ultracapacitor(s), and a plurality of discharging periods during which voltage is discharged by the ultracapacitor(s). In this manner, operation of the power converter can be controlled to output the first drive voltage to the ultracapacitor(s) during a first charging period.

At (410), the method (400) can include determining a second temperature of the capacitor power management circuit. For instance, the second temperature can be determined subsequent to the first temperature. In this manner, the second temperature can be a temperature of the circuit at a point in time subsequent to the point in time of the determination of the first temperature. In some implementations, the second temperature can be determined in accordance with the capacitor charging operation. For instance, the second temperature can be determined immediately prior to a second charging period.

At (412), the method (400) can include determining whether the second temperature is different than the first temperature. If the second temperature is not different than the first temperature, method (400) can return to (408), and operation of the power converter can be controlled to substantially achieve the first drive voltage during the second charging period. If the second temperature is different than the first temperature, at (414), method (400) can include determining a second drive voltage to be supplied to the ultracapacitor based at least in part on the second temperature. For instance, the second drive voltage can be the voltage along the derating curve corresponding to the second temperature.

At (416), the method (400) can include controlling operation of the power converter to substantially achieve the second drive voltage. For instance, the switching operation associated with the switching element(s) of the power converter can be adjusted such that, when the adjusted switching scheme is applied to the switching element(s), the power converter provides the second drive voltage as output. In this manner, the second drive voltage can be an adjusted drive voltage relative to the first drive voltage. The second drive voltage can be provided to the ultracapacitor(s) in accordance with the charging operation. For instance, the second drive voltage can be applied to the ultracapacitor(s) during a second charging period.

The method (400) depicts one example mode of operation of charging an ultracapacitor according to example embodiments of the present invention. It will be appreciated that various other suitable modes of operation can be used without deviating from the scope of the present invention. As an example, in some implementations, the one or more drive voltages may be determined without determining a temperature associated with the temperature sensing device. For instance, in implementations wherein a thermistor device is used, the drive voltage(s) may be determined by correlating drive voltage to thermistor resistance, for instance, using a lookup table or other indicator specifying drive voltage to thermistor resistance.

As indicated above, the ultracapacitor that is employed in the circuit of the present invention may generally contain a first electrode, a second electrode, a separator positioned between the first electrode and the second electrode, a nonaqueous electrolyte that is in ionic contact with the first electrode and the second electrode, and a housing within which the first electrode, the second electrode, the separator, and the electrolyte are retained. Various embodiments of these particular components are described in more detail below.

I. Electrodes

The first and second electrodes may contain first and second current collectors, respectively. The current collectors may be formed from the same or different materials. Regardless, each collector is typically formed from a substrate that includes a conductive metal, such as aluminum, stainless steel, nickel, silver, palladium, etc., as well as alloys thereof. Aluminum and aluminum alloys are particularly suitable for use in the present invention. The substrate may be in the form of a foil, sheet, plate, mesh, etc. The substrate may also have a relatively small thickness, such as about 200 micrometers or less, in some embodiments from about 1 to about 100 micrometers, in some embodiments from about 5 to about 80 micrometers, and in some embodiments, from about 10 to about 50 micrometers. Although by no means required, the surface of the substrate may be optionally roughened, such as by washing, etching, blasting, etc.

In certain embodiments, the current collector may contain a plurality of fiber-like whiskers that project outwardly from the substrate. The whiskers are typically formed from a material that contains carbon and/or a reaction product of carbon and the conductive metal. In one embodiment, for example, the material may contain a carbide of the conductive metal, such as aluminum carbide ($Al_4C_3$). If desired, the whiskers may optionally project from a seed portion that is embedded within the substrate. Similar to the whiskers, the seed portion may also be formed from a material that contains carbon and/or a reaction product of carbon and the conductive metal, such as a carbide of the conductive metal (e.g., aluminum carbide).

The manner in which such whiskers are formed on the substrate may vary as desired. In one embodiment, for instance, the conductive metal of the substrate is reacted with a hydrocarbon compound. Examples of such hydrocarbon compounds may include, for instance, paraffin hydrocarbon compounds, such as methane, ethane, propane, n-butane, isobutane, pentane, etc.; olefin hydrocarbon compounds, such as ethylene, propylene, butene, butadiene, etc.; acetylene hydrocarbon compounds, such as acetylene; as well as derivatives or combinations of any of the foregoing. It is generally desired that the hydrocarbon compounds are in a gaseous form during the reaction. Thus, it may be desired to employ hydrocarbon compounds, such as methane, ethane, and propane, which are in a gaseous form when heated. Although not necessarily required, the hydrocarbon compounds are typically employed in a range of from about 0.1 parts to about 50 parts by weight, and in some embodiments, from about 0.5 parts by weight to about 30 parts by weight, based on 100 parts by weight of the substrate. To initiate the reaction with the hydrocarbon and conductive metal, the substrate is generally heated in an atmosphere that is at a temperature of about 300° C. or more, in some embodiments about 400° C. or more, and in some embodiments, from about 500° C. to about 650° C. The time of heating depends on the exact temperature selected, but typically ranges from about 1 hour to about 100 hours. The atmosphere typically contains a relatively low amount of oxygen to minimize the formation of a dielectric film on the surface of the substrate. For example, the oxygen content of the atmosphere may be about 1% by volume or less.

The electrodes used in the ultracapacitor may also contain first and second carbonaceous materials that are coated onto one or both sides of the first and second current collectors, respectively. While they may be formed from the same or different types of materials and may contain one or multiple layers, each of the carbonaceous coatings generally contains at least one layer that includes activated particles. In certain embodiments, for instance, the activated carbon layer may be directly positioned over the current collector and may optionally be the only layer of the carbonaceous coating. Examples of suitable activated carbon particles may include, for instance, coconut shell-based activated carbon, petroleum coke-based activated carbon, pitch-based activated carbon, polyvinylidene chloride-based activated carbon, phenolic resin-based activated carbon, polyacrylonitrile-based activated carbon, and activated carbon from natural sources such as coal, charcoal or other natural organic sources.

In certain embodiments, it may be desired to selectively control certain aspects of the activated carbon particles, such as their particle size distribution, surface area, and pore size distribution to help improve ion mobility for certain types of electrolytes after being subjected to one or more charge-discharge cycles. For example, at least 50% by volume of the particles (D50 size) may have a size in the range of from about 0.01 to about 30 micrometers, in some embodiments from about 0.1 to about 20 micrometers, and in some embodiments, from about 0.5 to about 10 micrometers. At least 90% by volume of the particles (D90 size) may likewise have a size in the range of from about 2 to about 40 micrometers, in some embodiments from about 5 to about 30 micrometers, and in some embodiments, from about 6 to about 15 micrometers. The BET surface may also range from about 900 $m^2/g$ to about 3,000 $m^2/g$, in some embodiments from about 1,000 $m^2/g$ to about 2,500 $m^2/g$, and in some embodiments, from about 1,100 $m^2/g$ to about 1,800 $m^2/g$.

In addition to having a certain size and surface area, the activated carbon particles may also contain pores having a certain size distribution. For example, the amount of pores less than about 2 nanometers in size (i.e., "micropores") may provide a pore volume of about 50 vol. % or less, in some embodiments about 30 vol. % or less, and in some embodiments, from 0.1 vol. % to 15 vol. % of the total pore volume. The amount of pores between about 2 nanometers and about 50 nanometers in size (i.e., "mesopores") may likewise be from about 20 vol. % to about 80 vol. %, in some embodiments from about 25 vol. % to about 75 vol. %, and in some embodiments, from about 35 vol. % to about 65 vol. %. Finally, the amount of pores greater than about 50 nanometers in size (i.e., "macropores") may be from about 1 vol. % to about 50 vol. %, in some embodiments from about 5 vol. % to about 40 vol. %, and in some embodiments, from about 10 vol. % to about 35 vol. %. The total pore volume of the carbon particles may be in the range of from about 0.2 cm$^3$/g to about 1.5 cm$^3$/g, and in some embodiments, from about 0.4 cm$^3$/g to about 1.0 cm$^3$/g, and the median pore width may be about 8 nanometers or less, in some embodiments from about 1 to about 5 nanometers, and in some embodiments, from about 2 to about 4 nanometers. The pore sizes and total pore volume may be measured using nitrogen adsorption and analyzed by the Barrett-Joyner-Halenda ("BJH") technique as is well known in the art.

Binders may be employed in the carbonaceous coatings, such as in an amount of about 60 parts or less, in some embodiments 40 parts or less, and in some embodiments, from about 1 to about 25 parts per 100 parts of carbon in the coating. Binders may, for example, constitute about 15 wt. % or less, in some embodiments about 10 wt. % or less, and in some embodiments, from about 0.5 wt. % to about 5 wt. % of the total weight of a carbonaceous coating. Nevertheless, when employed, any of a variety of suitable binders can be used in the electrodes. For instance, water-insoluble organic binders may be employed in certain embodiments, such as styrene-butadiene copolymers, polyvinyl acetate homopolymers, vinyl-acetate ethylene copolymers, vinyl-acetate acrylic copolymers, ethylene-vinyl chloride copolymers, ethylene-vinyl chloride-vinyl acetate terpolymers, acrylic polyvinyl chloride polymers, acrylic polymers, nitrile polymers, fluoropolymers such as polytetrafluoroethylene or polyvinylidene fluoride, polyolefins, etc., as well as mixtures thereof. Water-soluble organic binders may also be employed, such as polysaccharides and derivatives thereof. In one particular embodiment, the polysaccharide may be a nonionic cellulosic ether, such as alkyl cellulose ethers (e.g., methyl cellulose and ethyl cellulose); hydroxyalkyl cellulose ethers (e.g., hydroxyethyl cellulose, hydroxypropyl cellulose, hydroxypropyl hydroxybutyl cellulose, hydroxyethyl hydroxypropyl cellulose, hydroxyethyl hydroxybutyl cellulose, hydroxyethyl hydroxypropyl hydroxybutyl cellulose, etc.); alkyl hydroxyalkyl cellulose ethers (e.g., methyl hydroxyethyl cellulose, methyl hydroxypropyl cellulose, ethyl hydroxyethyl cellulose, ethyl hydroxypropyl cellulose, methyl ethyl hydroxyethyl cellulose and methyl ethyl hydroxypropyl cellulose); carboxyalkyl cellulose ethers (e.g., carboxymethyl cellulose); and so forth, as well as protonated salts of any of the foregoing, such as sodium carboxymethyl cellulose.

If desired, other materials may also be employed within an activated carbon layer of the carbonaceous materials. For example, in certain embodiments, a conductivity promoter may be employed to further increase electrical conductivity. Exemplary conductivity promoters may include, for instance, carbon black, graphite (natural or artificial), graphite, carbon nanotubes, nanowires or nanotubes, metal fibers, graphenes, etc., as well as mixtures thereof. Carbon black is particularly suitable. When employed, conductivity promoters typically constitute about 60 parts or less, in some embodiments 40 parts or less, and in some embodiments, from about 1 to about 25 parts per 100 parts of the activated carbon particles in a carbonaceous coating. Conductivity promotes may, for example, constitute about 15 wt. % or less, in some embodiments about 10 wt. % or less, and in some embodiments, from about 0.5 wt. % to about 5 wt. % of the total weight of a carbonaceous coating. Activated carbon particles likewise typically constitute 85 wt. % or more, in some embodiments about 90 wt. % or more, and in some embodiments, from about 95 wt. % to about 99.5 wt. % of a carbonaceous coating.

The particular manner in which a carbonaceous material is coated onto to the sides of a current collector may vary as is well known to those skilled in the art, such as printing (e.g., rotogravure), spraying, slot-die coating, drop-coating, dip-coating, etc. Regardless of the manner in which it is applied, the resulting electrode is typically dried to remove moisture from the coating, such as at a temperature of about 100° C. or more, in some embodiments about 200° C. or more, and in some embodiments, from about 300° C. to about 500° C. The electrode may also be compressed (e.g., calendered) to optimize the volumetric efficiency of the ultracapacitor. After any optional compression, the thickness of each carbonaceous coating may generally vary based on the desired electrical performance and operating range of the ultracapacitor. Typically, however, the thickness of a coating is from about 20 to about 200 micrometers, 30 to about 150 micrometers, and in some embodiments, from about 40 to about 100 micrometers. Coatings may be present on one or both sides of a current collector. Regardless, the thickness of the overall electrode (including the current collector and the carbonaceous coating(s) after optional compression) is typically within a range of from about 20 to about 350 micrometers, in some embodiments from about 30 to about 300 micrometers, and in some embodiments, from about 50 to about 250 micrometers.

II. Nonaqueous Electrolyte

The electrolyte employed in the ultracapacitor is generally nonaqueous in nature and thus contains at least one nonaqueous solvent. To help extend the operating temperature range of the ultracapacitor, it is typically desired that the nonaqueous solvent have a relatively high boiling temperature, such as about 150° C. or more, in some embodiments about 200° C. or more, and in some embodiments, from about 220° C. to about 300° C. Particularly suitable high boiling point solvents may include, for instance, cyclic carbonate solvents, such as ethylene carbonate, propylene carbonate, butylene carbonate, vinylene carbonate, etc. Propylene carbonate is particularly suitable due to its high electric conductivity and decomposition voltage, as well as its ability to be used over a wide range of temperatures. Of course, other nonaqueous solvents may also be employed, either alone or in combination with a cyclic carbonate solvent. Examples of such solvents may include, for instance, open-chain carbonates (e.g., dimethyl carbonate, ethyl methyl carbonate, diethyl carbonate, etc.), aliphatic monocarboxylates (e.g., methyl acetate, methyl propionate, etc.), lactone solvents (e.g., butyrolactone valerolactone, etc.), nitriles (e.g., acetonitrile, glutaronitrile, adiponitrile, methoxyacetonitrile, 3-methoxypropionitrile, etc.), amides (e.g., N,N-dimethylformamide, N,N-diethylacetamide, N-methylpyrrolidinone), alkanes (e.g., nitromethane, nitroethane, etc.), sulfur compounds (e.g., sulfolane, dimethyl sulfoxide, etc.); and so forth.

The electrolyte also contains at least one ionic liquid, which may be dissolved in the nonaqueous solvent. While the concentration of the ionic liquid can vary, it is typically desired that the ionic liquid is present at a relatively high concentration. For example, the ionic liquid may be present in an amount of about 0.8 moles per liter (M) of the electrolyte or more, in some embodiments about 1.0 M or more, in some embodiments about 1.2 M or more, and in some embodiments, from about 1.3 to about 1.8 M.

The ionic liquid is generally a salt having a relatively low melting temperature, such as about 400° C. or less, in some embodiments about 350° C. or less, in some embodiments from about 1° C. to about 100° C., and in some embodiments, from about 5° C. to about 50° C. The salt contains a cationic species and counterion. The cationic species contains a compound having at least one heteroatom (e.g., nitrogen or phosphorous) as a "cationic center." Examples of such heteroatomic compounds include, for instance, unsubstituted or substituted organoquaternary ammonium compounds, such as ammonium (e.g., trimethylammonium, tetraethylammonium, etc.), pyridinium, pyridazinium, pyramidinium, pyrazinium, imidazolium, pyrazolium, oxazolium, triazolium, thiazolium, quinolinium, piperidinium, pyrrolidinium, quaternary ammonium spiro compounds in which two or more rings are connected together by a spiro atom (e.g., carbon, heteroatom, etc.), quaternary ammonium fused ring structures (e.g., quinolinium, isoquinolinium, etc.), and so forth. In one particular embodiment, for example, the cationic species may be an N-spirobicyclic compound, such as symmetrical or asymmetrical N-spirobicyclic compounds having cyclic rings. One example of such a compound has the following structure:

wherein m and n are independently a number from 3 to 7, and in some embodiments, from 4 to 5 (e.g., pyrrolidinium or piperidinium).

Suitable counterions for the cationic species may likewise include halogens (e.g., chloride, bromide, iodide, etc.); sulfates or sulfonates (e.g., methyl sulfate, ethyl sulfate, butyl sulfate, hexyl sulfate, octyl sulfate, hydrogen sulfate, methane sulfonate, dodecylbenzene sulfonate, dodecylsulfate, trifluoromethane sulfonate, heptadecafluorooctanesulfonate, sodium dodecylethoxysulfate, etc.); sulfosuccinates; amides (e.g., dicyanamide); imides (e.g., bis(pentafluoroethyl-sulfonyl)imide, bis(trifluoromethylsulfonyl)imide, bis(trifluoromethyl)imide, etc.); borates (e.g., tetrafluoroborate, tetracyanoborate, bis[oxalato]borate, bis[salicylato]borate, etc.); phosphates or phosphinates (e.g., hexafluorophosphate, diethylphosphate, bis(pentafluoroethyl)phosphinate, tris(pentafluoroethyl)-trifluorophosphate, tris(nonafluorobutyl)trifluorophosphate, etc.); antimonates (e.g., hexafluoroantimonate); aluminates (e.g., tetrachloroaluminate); fatty acid carboxylates (e.g., oleate, isostearate, pentadecafluorooctanoate, etc.); cyanates; acetates; and so forth, as well as combinations of any of the foregoing.

Several examples of suitable ionic liquids may include, for instance, spiro-(1,1')-bipyrrolidinium tetrafluoroborate, triethylmethyl ammonium tetrafluoroborate, tetraethyl ammonium tetrafluoroborate, spiro-(1,1')-bipyrrolidinium iodide, triethylmethyl ammonium iodide, tetraethyl ammonium iodide, methyltriethylammonium tetrafluoroborate, tetrabutylammonium tetrafluoroborate, tetraethylammonium hexafluorophosphate, etc.

III. Separator

The separator can enable electrical isolation of one electrode from another to help prevent an electrical short, but still allow transport of ions between the two electrodes. In certain embodiments, for example, a separator may be employed that includes a cellulosic fibrous material (e.g., airlaid paper web, wet-laid paper web, etc.), nonwoven fibrous material (e.g., polyolefin nonwoven webs), woven fabrics, film (e.g., polyolefin film), etc. Cellulosic fibrous materials are particularly suitable for use in the ultracapacitor, such as those containing natural fibers, synthetic fibers, etc. Specific examples of suitable cellulosic fibers for use in the separator may include, for instance, hardwood pulp fibers, softwood pulp fibers, rayon fibers, regenerated cellulosic fibers, etc. Regardless of the particular materials employed, the separator typically has a thickness of from about 5 to about 150 micrometers, in some embodiments from about 10 to about 100 micrometers, and in some embodiments, from about 20 to about 80 micrometers.

IV. Housing

The ultracapacitor also employs a housing within which the electrodes, electrolyte, and separator are retained. The manner in which the components are inserted into the housing may vary as is known in the art. For example, the electrodes and separator may be initially folded, wound, or otherwise contacted together to form an electrode assembly. The electrolyte may optionally be immersed into the electrodes of the assembly. In one particular embodiment, the electrodes, separator, and optional electrolyte may be wound into an electrode assembly having a "jelly-roll" configuration.

The nature of the housing may vary as desired. In certain embodiments, for example, the housing may be in the form of a flexible package that encloses the components of the ultracapacitor. The package may contain a substrate that may include any number of layers desired to achieve the desired level of barrier properties, such as 1 or more, in some embodiments 2 or more, and in some embodiments, from 2 to 4 layers. Typically, the substrate contains a barrier layer, which may include a metal, such as aluminum, nickel, tantalum, titanium, stainless steel, etc. Such a barrier layer is generally impervious to the electrolyte so that it can inhibit leakage thereof, and also generally impervious to water and other contaminants. If desired, the substrate may also contain an outer layer that serves as a protective layer for the package. In this manner, the barrier layer faces the electrochemical cells and the outer layer faces the exterior of the package. The outer layer may, for instance, be formed from a polymer film, such as those formed from a polyolefin (e.g., ethylene copolymers, propylene copolymers, propylene homopolymers, etc.), polyesters, etc. Particularly suitable polyester films may include, for example, polyethylene terephthalate, polyethylene naphthalate, polybutylene terephthalate, etc.

If desired, the substrate may also contain a sealing layer. The sealing layer may be continuous over the package such that it faces the electrochemical cells. Alternatively, the sealing layer may be employed only at the edges of the capacitor to help seal the package at and around the terminations. Regardless, the sealing layer may contain a heat-sealable polymer. Suitable heat-sealable polymers may include, for instance, vinyl chloride polymers, vinyl chloridine polymers, ionomers, etc., as well as combinations thereof. Ionomers are particularly suitable. In one embodiment, for instance, the ionomer may be a copolymer that contains an α-olefin and (meth)acrylic acid repeating unit. Specific α-olefins may include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Ethylene is particularly suitable. As noted, the copolymer may also a (meth)acrylic acid repeating unit. As used herein, the term "(meth)acrylic" includes acrylic and methacrylic monomers, as well as salts or esters thereof, such as acrylate and methacrylate monomers. Examples of such (meth) acrylic monomers may include methyl acrylate, ethyl acrylate, n-propyl acrylate, i-propyl acrylate, n-butyl acrylate, s-butyl acrylate, i-butyl acrylate, t-butyl acrylate, n-amyl acrylate, amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof. Typically, the α-olefin/(meth) acrylic acid copolymer is at least partially neutralized with a metal ion to form the ionomer. Suitable metal ions may include, for instance, alkali metals (e.g., lithium, sodium, potassium, etc.), alkaline earth metals (e.g., calcium, magnesium, etc.), transition metals (e.g., manganese, zinc, etc.), and so forth, as well as combinations thereof. The metal ions may be provided by an ionic compound, such as a metal formate, acetate, nitrate, carbonate, hydrogen carbonate, oxide, hydroxide, alkoxide, and so forth.

Apart from a flexible package, such as described above, other housing configurations may also be employed. For example, the housing may contain a metal container ("can"), such as those formed from tantalum, niobium, aluminum, nickel, hafnium, titanium, copper, silver, steel (e.g., stainless), alloys thereof, composites thereof (e.g., metal coated with electrically conductive oxide), and so forth. Aluminum is particularly suitable for use in the present invention. The metal container may have any of a variety of different shapes, such as cylindrical, D-shaped, etc. Cylindrically-shaped containers are particular suitable.

The ultracapacitor can generally exhibit excellent electrical properties. For example, the ultracapacitor may exhibit a capacitance of about 6 Farads per cubic centimeter ("F/cm$^3$") or more, in some embodiments about 8 F/cm$^3$ or more, in some embodiments from about 9 to about 100 F/cm$^3$, and in some embodiments, from about 10 to about 80 F/cm$^3$, measured at a temperature of 23° C., frequency of 120 Hz, and without an applied voltage. The ultracapacitor may also have a low equivalence series resistance ("ESR"), such as about 150 mohms or less, in some embodiments less than about 125 mohms, in some embodiments from about 0.01 to about 100 mohms, and in some embodiments, from about 0.05 to about 70 mohms, determined at a temperature of 23° C., frequency of 100 kHz, and without an applied voltage.

Notably, the ultracapacitor may also exhibit excellent electrical properties even when exposed to high temperatures. For example, the ultracapacitor may be placed into contact with an atmosphere having a temperature of from about 80° C. or more, in some embodiments from about 100° C. to about 150° C., and in some embodiments, from about 105° C. to about 130° C. (e.g., 85° C. or 105° C.). The capacitance and ESR values can remain stable at such temperatures for a substantial period of time, such as for about 100 hours or more, in some embodiments from about 300 hours to about 5000 hours, and in some embodiments, from about 600 hours to about 4500 hours (e.g., 168, 336, 504, 672, 840, 1008, 1512, 2040, 3024, or 4032 hours).

In one embodiment, for example, the ratio of the capacitance value of the ultracapacitor after being exposed to the hot atmosphere (e.g., 85° C. or 105° C.) for 1008 hours to the capacitance value of the ultracapacitor when initially exposed to the hot atmosphere is about 0.75 or more, in some embodiments from about 0.8 to 1.0, and in some embodiments, from about 0.85 to 1.0. Such high capacitance values can also be maintained under various extreme conditions, such as when applied with a voltage and/or in a humid atmosphere. For example, the ratio of the capacitance value of the ultracapacitor after being exposed to the hot atmosphere (e.g., 85° C. or 105° C.) and an applied voltage to the initial capacitance value of the ultracapacitor when exposed to the hot atmosphere but prior to being applied with the voltage may be about 0.60 or more, in some embodiments from about 0.65 to 1.0, and in some embodiments, from about 0.7 to 1.0. The voltage may, for instance, be about 1 volt or more, in some embodiments about 1.5 volts or more, and in some embodiments, from about 2 to about 10 volts (e.g., 2.1 volts). In one embodiment, for example, the ratio noted above may be maintained for 1008 hours or more. The ultracapacitor may also maintain the capacitance values noted above when exposed to high humidity levels, such as when placed into contact with an atmosphere having a relative humidity of about 40% or more, in some embodiments about 45% or more, in some embodiments about 50% or more, and in some embodiments, about 70% or more (e.g., about 85% to 100%). Relative humidity may, for instance, be determined in accordance with ASTM E337-02, Method A (2007). For example, the ratio of the capacitance value of the ultracapacitor after being exposed to the hot atmosphere (e.g., 85° C. or 105° C.) and high humidity (e.g., 85%) to the initial capacitance value of the ultracapacitor when exposed to the hot atmosphere but prior to being exposed to the high humidity may be about 0.7 or more, in some embodiments from about 0.75 to 1.0, and in some embodiments, from about 0.80 to 1.0. In one embodiment, for example, this ratio may be maintained for 1008 hours or more.

The ESR can also remain stable at such temperatures for a substantial period of time, such as noted above. In one embodiment, for example, the ratio of the ESR of the ultracapacitor after being exposed to the hot atmosphere (e.g., 85° C. or 105° C.) for 1008 hours to the ESR of the ultracapacitor when initially exposed to the hot atmosphere is about 1.5 or less, in some embodiments about 1.2 or less, and in some embodiments, from about 0.2 to about 1. Notably, such low ESR values can also be maintained under various extreme conditions, such as when applied with a high voltage and/or in a humid atmosphere as described above. For example, the ratio of the ESR of the ultracapacitor after being exposed to the hot atmosphere (e.g., 85° C. or 105° C.) and an applied voltage to the initial ESR of the ultracapacitor when exposed to the hot atmosphere but prior to being applied with the voltage may be about 1.8 or less, in some embodiments about 1.7 or less, and in some embodiments, from about 0.2 to about 1.6. In one embodiment, for example, the ratio noted above may be maintained for 1008 hours or more. The ultracapacitor may also maintain the ESR values noted above when exposed to high humidity levels. For example, the ratio of the ESR of the ultracapacitor after being exposed to the hot atmosphere (e.g., 85° C. or 105° C.) and high humidity (e.g., 85%) to the initial capacitance value of the ultracapacitor when exposed to the hot atmosphere but prior to being exposed to the high humidity may be about 1.5 or less, in some embodiments about 1.4 or less, and in some embodiments, from about 0.2 to about 1.2. In one embodiment, for example, this ratio may be maintained for 1008 hours or more.

The present invention may be better understood with reference to the following example.

Test Methods

Equivalent Series Resistance (ESR)

Equivalence series resistance may be measured using a Keithley 3330 Precision LCZ meter with a DC bias of 0.0 volts, 1.1 volts, or 2.1 volts (0.5 volt peak to peak sinusoidal signal). The operating frequency is 1 kHz. A variety of temperature and relative humidity levels may be tested. For example, the temperature may be 23° C., 85° C. or 105° C., and the relative humidity may be 25% or 85%.

Capacitance

The capacitance may be measured using a Keithley 3330 Precision LCZ meter with a DC bias of 0.0 volts, 1.1 volts, or 2.1 volts (0.5 volt peak to peak sinusoidal signal). The operating frequency is 120 Hz. A variety of temperature and relative humidity levels may be tested. For example, the temperature may be 23° C., 85° C. or 105° C., and the relative humidity may be 25% or 85%.

EXAMPLE

The ability to form an ultracapacitor for use in the circuit of the present invention was demonstrated. Initially, each side of two aluminum current collectors (thickness of 12 to 50 μm) containing aluminum carbide whiskers were coated with a mixture of 10-40 wt. % of activated carbon particles, 2-10 wt. % of a styrene-butadiene copolymer, and 5-40 wt. % of sodium carboxymethylcellulose. The activated carbon particles had a D50 size of about 5-20 μm and a BET surface area of about 1300-2200 $m^2/g$. The activated carbon particles contained pores with a size of less than 2 nanometers in an amount of less than 10 vol. %, pores with a size of 2 to 50 nanometers in an amount of about 40 to 70 vol. %, and pores with a size of greater than 50 nm in an amount of about 20 to 50 vol. %. The thickness of each resulting coating was about 12 to 200 μm. The electrodes were then calendered and dried under vacuum at a temperature of from 70° C. to 150° C. Once formed, the two electrodes were assembled with an electrolyte and separators (cellulose material having a thickness of 25 μm). The electrolyte contained 5-azoniaspiro[4,4]-nonanetetrafluoroborate at a concentration of 1.05 to 2.5 M in propylene carbonate. The resulting strip is cut into individual electrodes and assembled by stacking electrodes alternately with separators therebetween. Once the electrode stack is complete, all electrode terminals are welded to a single aluminum terminal. This assembly is then put into a plastic/aluminum/plastic laminated packaging material and all but one of the edges are heat sealed together. Next, the electrolyte is injected into the package through the open edge. The electrolyte-filled package is then put under vacuum and the final edge is heat sealed to complete the finished package. The resulting cells were formed and tested for ESR, capacitance, and volumetric efficiency. The results are set forth below in Tables 1-6:

TABLE 1

Average ESR (mohms) for 24 Samples at 0.0 Volt Bias

| | Time (hrs) | | | | | | | | | | |
|---|---|---|---|---|---|---|---|---|---|---|---|
| | 0 | 168 | 336 | 504 | 672 | 840 | 1008 | 1512 | 2040 | 3024 | 4032 |
| 85° C. | 65 | 61 | 59 | 62 | 64 | 63 | 64 | 64 | 62 | 62 | 64 |
| 105° C. | 62 | 54 | 52 | 57 | 60 | 60 | 60 | 58 | 58 | 57 | 58 |

TABLE 2

Average Capacitance for 24 Samples at 0.0 Volt Bias

| | Time (hrs) | | | | | | | | | | |
|---|---|---|---|---|---|---|---|---|---|---|---|
| | 0 | 168 | 336 | 504 | 672 | 840 | 1008 | 1512 | 2040 | 3024 | 4032 |
| 85° C. F | 2.1 | 2.0 | 2.0 | 2.0 | 1.9 | 1.9 | 1.9 | 2.0 | 2.0 | 2.0 | 1.9 |
| 85° C. F/cm$^3$ | 10.3 | 10.1 | 9.8 | 9.7 | 9.7 | 9.7 | 9.7 | 9.7 | 9.7 | 9.7 | 9.6 |
| 105° C. F | 2.0 | 2.0 | 1.9 | 1.9 | 1.9 | 1.9 | 1.9 | 1.9 | 1.9 | 1.9 | 1.8 |
| 105° C. F/cm$^3$ | 9.9 | 9.9 | 9.7 | 9.6 | 9.5 | 9.4 | 9.4 | 9.4 | 9.3 | 9.2 | 9.0 |

TABLE 3

Average ESR (mohms) for 16 Samples at 0.0 Volt Bias

| | Time (hrs) | | | | | | |
|---|---|---|---|---|---|---|---|
| | 0 | 168 | 336 | 504 | 672 | 840 | 1008 |
| 85° C., 85% Relative Humidity | 121 | 133 | 144 | 152 | 166 | 177 | 187 |

TABLE 4

Average Capacitance for 16 Samples at 0.0 Volt Bias

| | | Time (hrs) | | | | | | |
|---|---|---|---|---|---|---|---|---|
| | | 0 | 168 | 336 | 504 | 672 | 840 | 1008 |
| 85° C., 85% Relative Humidity | F | 1.5 | 1.2 | 1.1 | 1.2 | 1.1 | 1.1 | 1.1 |
| 85° C., 85% Relative Humidity | F/cm$^3$ | 7.7 | 5.7 | 5.7 | 6.0 | 5.5 | 5.6 | 5.5 |

TABLE 5

Average ESR (mohms) for 10 Samples at 2.1 Volt Bias

| | Time (hrs) | | | | | | |
|---|---|---|---|---|---|---|---|
| | 0 | 168 | 336 | 504 | 672 | 840 | 1008 |
| 85° C. | 146 | 163 | 167 | 169 | 171 | 173 | 175 |

TABLE 6

Average Capacitance for 16 Samples at 2.1 Volt Bias

| | | Time (hrs) | | |
|---|---|---|---|---|
| | | 0 | 504 | 1008 |
| 85° C., 85% Relative Humidity | F | 2.0 | 1.8 | 1.7 |
| 85° C., 85% Relative Humidity | F/cm$^3$ | 10.1 | 9.2 | 8.7 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A circuit for providing a drive voltage to an ultracapacitor, the circuit comprising:
a power source configured to provide a source voltage;
an ultracapacitor that comprises a first electrode, a second electrode, a separator positioned between the first electrode and the second electrode, a nonaqueous electrolyte that is in ionic contact with the first electrode and the second electrode, and a housing within which the first electrode, the second electrode, the separator, and the electrolyte are retained;
a temperature sensing device;
a power converter configured to receive the source voltage and to supply a drive voltage to the ultracapacitor; and
one or more control circuits configured to receive one or more signals indicative of a temperature associated with the ultracapacitor from the temperature sensing device and to control operation of the power converter based at least in part on the one or more signals indicative of the temperature associated with the ultracapacitor.

2. The circuit of claim 1, wherein the temperature sensing device comprises a thermistor device.

3. The circuit of claim 2, wherein the thermistor device comprises a negative temperature coefficient thermistor device.

4. The circuit of claim 1, wherein the one or more control circuits are configured to control operation of the power converter to adjust the drive voltage provided to the ultracapacitor based at least in part on the one or more signals indicative of the temperature associated with the ultracapacitor.

5. The circuit of claim 1, wherein the one or more control circuits are configured to control operation of the power converter to decrease the drive voltage provided to the ultracapacitor when the one or more signals indicative of temperature indicate an increase in temperature of the ultracapacitor.

6. The circuit of claim 1, wherein the power converter comprises one or more switching elements, the one or more control circuits are configured to control operation of the power converter by controlling switching of the switching elements based at least in part on the one or more signals indicative of the temperature associated with the ultracapacitor.

7. The circuit of claim 6, wherein at least one of the one or more switching elements comprises a field-effect transistor.

8. The circuit of claim 1, wherein the power converter operates as a buck power converter.

9. The circuit of claim 1, wherein the power converter operates as a boost power converter.

10. The circuit of claim 1, wherein the one or more control circuits are configured to control operation of the power converter based at least in part on a derating curve associated with the ultracapacitor, the derating curve correlating temperature associated with the ultracapacitor to a drive voltage associated with the ultracapacitor.

11. The circuit of claim 10, wherein the derating curve specifies a decrease in drive voltage when the temperature associated with the ultracapacitor increases.

12. The circuit of claim 1, wherein the first electrode comprises a first current collector electrically coupled to a first carbonaceous coating, and wherein the second electrode comprises a second current collector electrically coupled to a second carbonaceous coating, wherein the first current collector and the second current collector each contain a substrate that includes a conductive metal.

13. The circuit of claim 12, wherein a plurality of fiber-like whiskers project outwardly from the substrate of the first current collector, the substrate of the second current collector, or both.

14. The circuit of claim 12, wherein the first carbonaceous coating, the second carbonaceous coating, or both contain activated carbon particles.

15. The circuit of claim 1, wherein the nonaqueous electrolyte contains an ionic liquid that is dissolved in a nonaqueous solvent, wherein the ionic liquid contains a cationic species and a counterion.

16. The circuit of claim 15, wherein the nonaqueous solvent includes propylene carbonate.

17. The circuit of claim 15, wherein the cationic species includes an organoquaternary ammonium compound.

18. The circuit of claim 17, wherein the organoquaternary ammonium compound has the following structure:

wherein m and n are independently a number from 3 to 7.

19. The circuit of claim 15, wherein the ionic liquid is present at a concentration of about 1.0 M or more.

20. The circuit of claim 1, wherein the separator includes a cellulosic fibrous material.

21. The circuit of claim 1, wherein the housing contains a flexible package.

22. The circuit of claim 1, wherein the housing contains a metal container.

23. The circuit of claim 22, wherein the metal container has a cylindrical shape.

24. The circuit of claim 1, wherein the first electrode, the second electrode, and the separator are wound into an electrode assembly having a jellyroll configuration.

25. A method of charging an ultracapacitor, the method comprising:
receiving one or more signals indicative of a temperature associated with an ultracapacitor from a temperature sensing device, wherein the ultracapacitor comprises a first electrode, a second electrode, a separator positioned between the first electrode and the second electrode, a nonaqueous electrolyte that is in ionic contact with the first electrode and the second electrode, and a housing within which the first electrode, the second electrode, the separator, and the electrolyte are retained;
determining a drive voltage to be provided to an ultracapacitor based at least in part on the one or more signals indicative of temperature associated with the ultracapacitor and controlling operation of a power converter coupled to the ultracapacitor to provide the drive voltage to the ultracapacitor.

26. The method of claim 25, wherein determining a drive voltage to be provided to an ultracapacitor based at least in part on the one or more signals indicative of temperature comprises:
determining a temperature associated with the ultracapacitor based at least in part on the one or more signals; and
determining the drive voltage based at least in part on the temperature associated with the ultracapacitor.

27. The method of claim 25, wherein the drive voltage is determined based at least in part on a derating curve associated with the ultracapacitor.

28. The method of claim 27, wherein the derating curve specifies a decrease in drive voltage when the temperature associated with the ultracapacitor increases.

* * * * *